Oct. 31, 1967  L. O. GOFF  3,350,217
PROCESS FOR COATING PAPER USING THE PAPER TO BE COATED
FOR WORKING THE COATING
Filed May 11, 1965  6 Sheets-Sheet 1

INVENTOR
LINDSAY O. GOFF

BY Russell, Chittick & Pfund
ATTORNEYS

INVENTOR
LINDSAY O. GOFF
BY Russell, Chittick & Pfund
ATTORNEYS

Oct. 31, 1967     L. O. GOFF     3,350,217
PROCESS FOR COATING PAPER USING THE PAPER TO BE COATED
FOR WORKING THE COATING
Filed May 11, 1965     6 Sheets-Sheet 4

FIG.11

INVENTOR
LINDSAY O. GOFF

BY Russell, Chittick & Pfund
ATTORNEYS

Oct. 31, 1967  L. O. GOFF  3,350,217
PROCESS FOR COATING PAPER USING THE PAPER TO BE COATED
FOR WORKING THE COATING
Filed May 11, 1965  6 Sheets-Sheet 5

FIG. 12

INVENTOR
LINDSAY O. GOFF
BY,
Russell, Chittick & Pfund

ATTORNEYS

FIG. 13

INVENTOR.
LINDSAY O. GOFF

3,350,217
PROCESS FOR COATING PAPER USING THE PAPER TO BE COATED FOR WORKING THE COATING
Lindsay O. Goff, Westbrook, Maine, assignor to S. D. Warren Company, Boston, Mass., a corporation of Massachusetts
Filed May 11, 1965, Ser. No. 461,576
4 Claims. (Cl. 117—64)

The present application is a continuation-in-part of Ser. No. 189,783, filed Apr. 24, 1962, now abandoned. The invention relates to new and improved coating process and apparatus. The invention is herein disclosed in relation to apparatus for applying aqueous coating compositions to continuous moving webs of paper, paperboard and related products. It will be apparent that the process is not limited to the particular apparatus disclosed and that it can also be practised to coat different kinds of materials.

The coating process of the invention deals with the application of a fluid coating composition to a moving web and the distribution and smoothing of the applied coating composition by a surface traveling in a direction opposite to that of the moving web. In the past this process has been performed by what is referred to in the papermaking industry as the "reverse roller" coating process which provides for coating and smoothing a web by means of a roller operating in an opposite direction of travel to that of the coated web. Munch, in U.S. Patent No. 1,847,065, shows one form of a reverse roll coater by which a predetermined quantity of fluid coating is transferred from a reversely turning roll to a paper web in contact therewith. A different form of a reverse-roll coating has been proposed in the past whereby an excess of coating composition is first applied to a paper web and the excess is then removed by a reversely turning roll.

In these operations, the reversely turning roll is the smoothing roll and in some cases also the coating roll. It is evident to one skilled in the art that there are coating problems involved in the use of such a method. Any contamination occurring on the reverse roller results in a web having a poor surface, pattern development or streaking. To decrease this contamination metering rollers and doctor blades were introduced to apply a clean smooth coat. In one attempt to achieve the desired smooth pattern-free surface, standard coating rollers were even replaced by plush rollers.

It is an object of this invention to provide a new coating process which eliminates the problems associated with the reverse roller coating process.

Another object of this invention is to separate the coating process from the smoothing process.

A further object of this invention is to provide a continuously smooth and uncontaminated surface for the smoothing of the coated web by arrangements which provide a web coated and smoothed by itself.

A still further object of this invention is to provide for coating two sheets in a single operation, thereby producing two single or double coated webs.

In general, the past problems associated with reverse-roll coating have been resolved by the present invention without introducing factors which in themselves create major new obstacles. The present invention in one form thereof is a modification of reverse-roll coating in its most basic form, but with a new, continuously clean and smooth surface used to smooth the coated web. The new surface is the paper web itself prior to being coated.

The present invention applies an excess of coating composition to a moving web of paper by any suitable means, such as herein disclosed or as known in the prior art. While this coating on the primary web surface is still in a moist condition, it encounters in a nip a secondary paper surface traveling in a direction that is opposite to its own. The effect of the secondary surface is to level and smooth the primary coated surface and to limit the weight of the coating left thereon. In addition, the secondary surface itself becomes single coated by its contact with the primary coated surface so that when the web has advanced the now single coated web through the point where the excess coating is applied, the thus double coated web becomes the primary surface web which is smoothed by the portion of the web in the secondary position. Either or both the primary and secondary surfaces may be uncoated sheets or previously coated sheets before being subjected to the operation of this invention and where the primary and secondary surfaces are on separate webs the two webs may be both double coated or both may be single coated.

Further objects and features of this invention will best be understood and appreciated from a detailed description of the disclosed embodiments thereof, selected for the purposes of illustrating various modes of practising the invention, as shown in the accompanying drawings in which.

Figure 1:
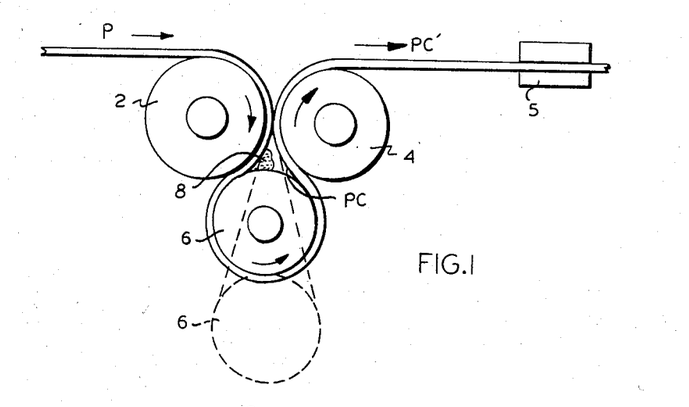
FIG. 1 is a diagrammatic view in cross section of a reverse-roller embodiment of this invention showing a paper web coated and smoothed by itself in a nip.

Referring to FIG. 1, a coating apparatus for a paper web P comprises a first roll 2 turning in a direction and at a speed to move with the uncoated paper P which passes down around a feed roll 6 and up over a third roll 4 which is turning with the paper. In operation the roll 6 is moved up to provide a metering nip between the feed roll 6 and the roll 2, and a pool of coating composition 8 is maintained at the nip by any conventional supply means (not shown). The spacing between the rolls 2 and 6 at the nip is adjustable for metering the composition 8, and the spacing between the rolls 2 and 4 at the nip is also adjustable for control of the smoothing operation as provided by the invention. The dashed line position of the roll 6 indicates the position which the roll takes for threading the web P around the rolls as indicated prior to starting the coating operation.

The operation commences with uncoated paper web P traveling around roller 2 and through the nip between rolls 2 and 6 which meters a layer of the coating composition 8 onto one surface of the web P. Upon leaving the roll 6, the coated web PC travels into the nip formed by rollers 2 and 4. As it passes through the nip, the coated web PC encounters entering uncoated paper web P traveling in a direction opposite to its own. Upon contact of their respective surfaces, the clean uncoated paper web P removes the excess coating composition and meters and smoothes the wet coating on web PC. The clean web P is partially coated itself prior to entering the coating nip between rolls 2 and 6. The finished, smoothed, coated web PC' is led to any suitable drying device 5 from the roll 4.

Figure 2:
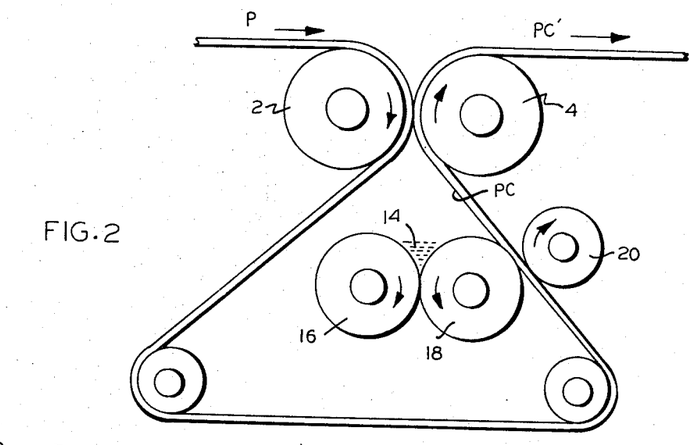
FIG. 2 is a diagrammatic view in cross section of another reverse-roller embodiment of this invention showing a paper web coated and smoothed by itself in a nip.

In FIG. 2 the smoothing operation is provided by the web as it travels through the nip formed by rollers 2 and 4, as in FIG. 1, but the method of applying the coating composition is different. In this case, a coating pool 14 is maintained above the nip formed by metering rollers 16 and 18 and a layer of coating composition is applied to the surface of roll 18 before contacting the web P. Roller 18 applies this layer of coating to the paper web P as web P enters the nip formed by rollers 18 and 20. The newly coated paper web PC travels on to the nip formed by the rollers 2 and 4 for the metering and smoothing operation as described above with respect to FIG. 1.

Figure 3:
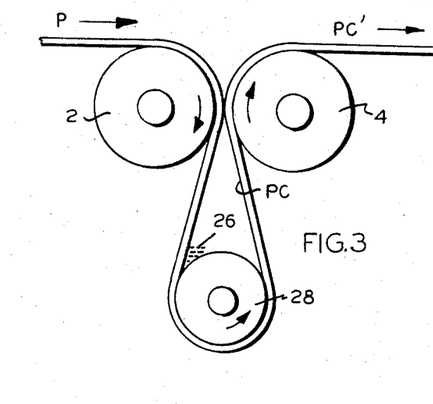
FIG. 3 is a diagrammatic view in cross section of another reverse-roller embodiment of this invention showing a paper web coated and smoothed by itself in a nip.

In FIG. 3, the smoothing operation is the same as in FIG. 1, but the method of applying the coating composition is different. In this case, uncoated paper web P travels over the roller 2 and around a coating roll 28. A pool 26 of coating material is maintained between the web P and the roll 28. As the web PC leaves the roll 28, a layer of coating composition remains thereon. The coated paper web PC travels on to the nip formed by rollers 2 and 4 for the metering and smoothing operation described above with respect to FIG. 1.

Figure 4:
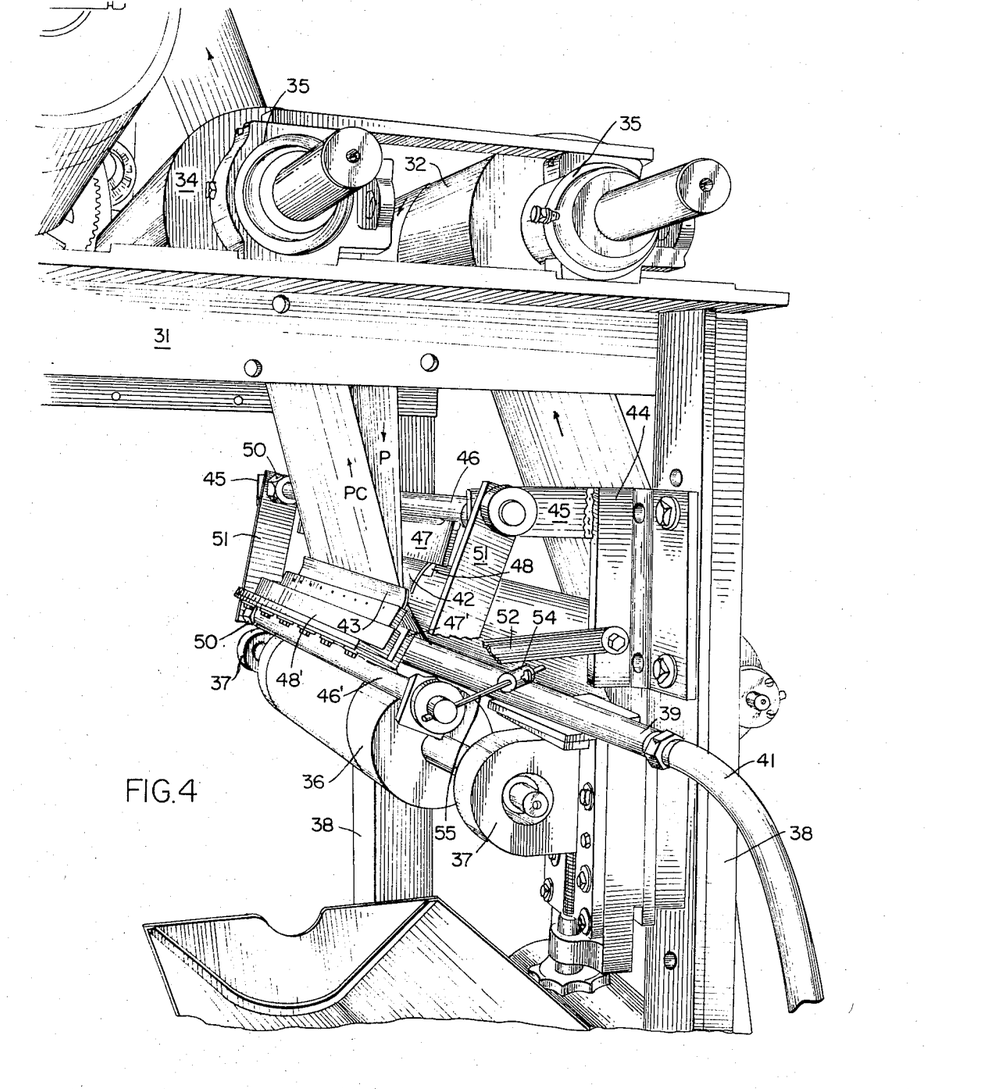
FIG. 4 is a perspective view of another embodiment of this invention showing a blade support arrangement for the moving web.

Referring now to FIG. 4, an embodiment of the invention which provides blade supports for the oppositely moving webs at the point of contact will be described. In the apparatus shown, a frame 31 is provided which supports an entrance roll 32 and an exit roll 34 over which the web to be coated passes. The rolls 32 and 34 are journaled in bearings 35 supported on the upper side of the frame 31.

Beneath the rolls 32 and 34, a coating roll 36 is journaled in bearings 37 which are supported from side rails 38 of the frame 31. An apertured feed pipe 39 extends horizontally above the roll 36 and is supplied at one end through a hose 41 with the liquid coating composition to be applied to the paper. By means of the continuous supply of the liquid coating composition under pressure from the hose 41, the supply pipe 39 maintains a continuous pool between the surface of the roller 36 and the uncoated web P which travels downwardly from the roll 32 to go around the roll 36. In this fashion, a layer of coating composition is applied to the inside surface of the web P as it is in contact with the surface of the roll 36 in much the same manner as indicated on the roll 28 in FIG. 3. The coated web PC travels upwardly from the coating roll 36 and ultimately passes over the exit roll 34 to be dried and stored.

Supported directly above the axis of the roll 36 are a pair of blades 42 and 43 which support the uncoated web P and the coated web PC in contact with each other in a nip in accordance with the invention. The support assembly for the blades 42 and 43 comprises a bracket 44 attached to the column 38 with a projecting lug 45 for supporting a rod 46. Welded to the rod 46 is an angle iron 47 which provides with a second angle iron 48 a clamping arrangement for the blade 42.

Depending from the shaft 46 at either end are a pair of bars 51 which can be fixed at any desired inclination by means of a tie bar 52. At the lower end of the bars 51, a shaft 46' is supported rotatably relative to the bars 51. On the shaft 46' is secured an angle iron 47' which together with the angle iron 48' provides a clamp support assembly for the blade 43 similar to that provided for the blade 42.

The angular position of the rod 46 may be secured by any suitable means to support the blade 42 at a desired angle of inclination against the back surface of the uncoated paper P. The spacing between the two blades 42 and 43 is initially established by the length of the link 52 which determines the angular position of the movable links 51 relative to the horizontal lugs 45. The final adjustment of the position of the blade 43 is determined by means of a pressure adjusting weight 54 which is adjustably positioned on a lever arm 55 secured to the shaft 46'.

The edges of the blades 42 and 43 extend to an overlapped relation therebetween, and in normal operation the uncoated web P moves downward with its back surface in contact with the blade 42 while the coated web PC moves upward with its back uncoated surface in contact with the blade 43. Under dynamic operating conditions, the spacing between the blades will be determined by all of the factors involved, such as the speed, the thickness and consistency of the coating and the pressure with which the blades 42 and 43 are urged together. The speed of the paper is a primary control while the position of the weight 54 as a pressure adjustment is a secondary control to produce the desired results in terms of thickness and weight of the coating on the surface of the web PC. An alternative arrangement would provide merely a rotative adjustment of the shafts 46, 46' to provide a fixed spacing between the blades 42 or 43. The flexing of the resilient blades provides the pressure against the back surface of the webs P and PC in this alternate arrangement. A suitable lock nut 50 on the shafts 46, 46' is provided for this purpose to hold the shafts in their adjusted positions when the nuts 50 are tightened. The blades 42 and 43 may be of any thin flexible material such as stainless steel or Phosphor bronze preferably of a material hard enough to resist wear over long periods of time as the web moves over the edges of the blades.

The arrangement of FIG. 4 thus provides the smoothing of the coated web PC by the smooth uncoated surface of the web P as they move in opposite directions and in contact between the blades 42 and 43. The portion of the coating composition which is applied to the web P at this point provides the initial single coat which is supplemented by the additional material applied as the web P travels around the coating roll 36.

Figure 5:
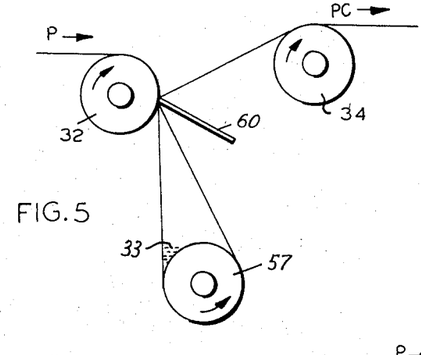
FIGS. 5, 6, 7, 8, and 9 are diagrammatic views in cross section of other embodiments of this invention showing alternative arrangements and methods for supporting the paper web during the smoothing process in the nip.

A number of modified arrangements for supporting the oppositely moving webs in surface contact may be provided, and FIGS. 5 through 9 show modified arrangements for this purpose. In each instance suitable entrance and exit rolls 32 and 34 are provided, and any suitable arrangement for applying the coating in a coating bath will be required. For example, a coating pool 33 can be maintained by a coating roll 57 as one suitable coating arrangement. Intermediate the entrance and exit rolls 32 and 34 and the position of the coating means 33, 57 is provided a modified arrangement for supporting the moving webs in surface contact in a nip. In FIG. 5 the entrance roll 32 is employed as a supporting surface for the uncoated web P. At a point where the roll 32 completely supports the web P, a blade 60 is urged against the surface of the roll 32 thereby forming the nip in which the coated surface is worked. The spacing between the surface of the roll 32 and the edge of the blade 60 at which the process operates is determined by the various factors involved and controlled by the pressure of the blade 60 against the roll 32. In this embodiment the roll 32 acts as both an entrance roll and as a support for the uncoated web P.

Figure 6:
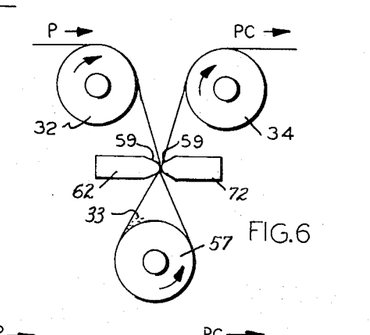
Figure 7:
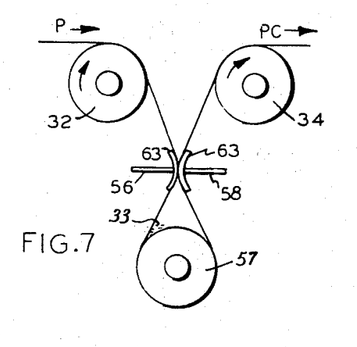

FIGS. 6 and 7 show two stationary type supports for holding the uncoated web P and the coated web PC in surface contact in a nip. In FIG. 6 a pair of horizontal rigid bars 62 and 72 are urged together and operate with a predetermined spacing under dynamic conditions to form the desired nip. Surfaces 59 at the ends of the bar are rounded and smoothed to provide low friction support for the moving webs without danger of tearing. The arrangement of FIG. 7 provides two horizontal rigid supports 56 and 58 which have attached at the opposed ends thereof smooth flexible metal face members 63 which conform to the shape of the running web at their positions remote from the supports 56 and 58, but provide increasing support inwardly from the edges of the member 63 toward their supporting structure 56 and 58.

Figure 8:
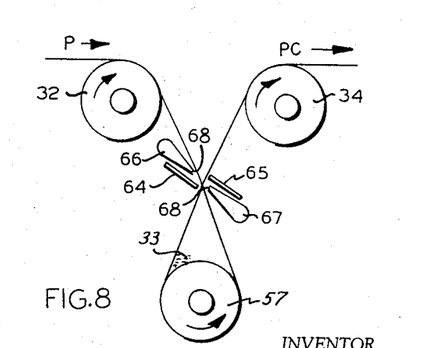

In FIG. 8 a pair of blades 64 and 65 are arranged in spaced relation and cooperate with a pair of air doctors 66 and 67 for control of the pressure with which the sheets P and PC are held in contact in the nip during the smoothing and metering process. The air doctors 66 and 67 provide a high pressure jet from the apexes 68 thereof, which is confined by the respective blades 64 or 65 to be effective to hold the sheets P and PC into contact with any desired degree of force.

Figure 9:
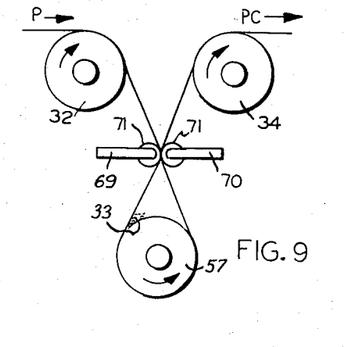

In FIG. 9 the sheets P and PC are held together by a pair of spaced rollers 71 supported on rigid horizontal supports 69 and 70. When the supports 69 and 70 are urged together the spaced rollers form a nip which provides the desired pressure during operating conditions. In each of the embodiments in FIGS. 5 through 9, the advantages of the invention are achieved by virtue of the smooth uncoated web P being applied to smooth and finish the surface of the coated web PC.

Figure 10:
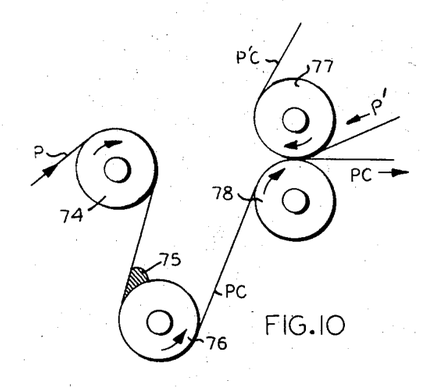
FIG. 10 is a diagrammatic view in cross section of a modification of this invention showing in the same operation the single coating of a secondary web and the single coating and smoothing of the primary web in the nip.

FIG. 10 shows a modification of this invention in which two separate webs P and P' are employed. The web P is coated and smoothed, while the web P' is coated. In FIG. 10, uncoated paper web P travels around roller 74 and is coated by a supply of coating composition 75 as the web passes around roll 76. Upon leaving the roll 76, the paper web PC travels into the nip formed by rollers 77 and 78. As web PC passes through this nip, it encounters entering uncoated paper web P' traveling in an opposite direction. Upon contact of their respective surfaces, the clean uncoated paper web P' meters and smoothes the wet coating on web PC, and in turn is single coated itself as web P'C. The rolls 77 and 78 are supported for adjustable spacing therebetween and urged toward their adjusted positions in a manner to control the pressure on the webs in the nip during operation of the process.

Figure 11:
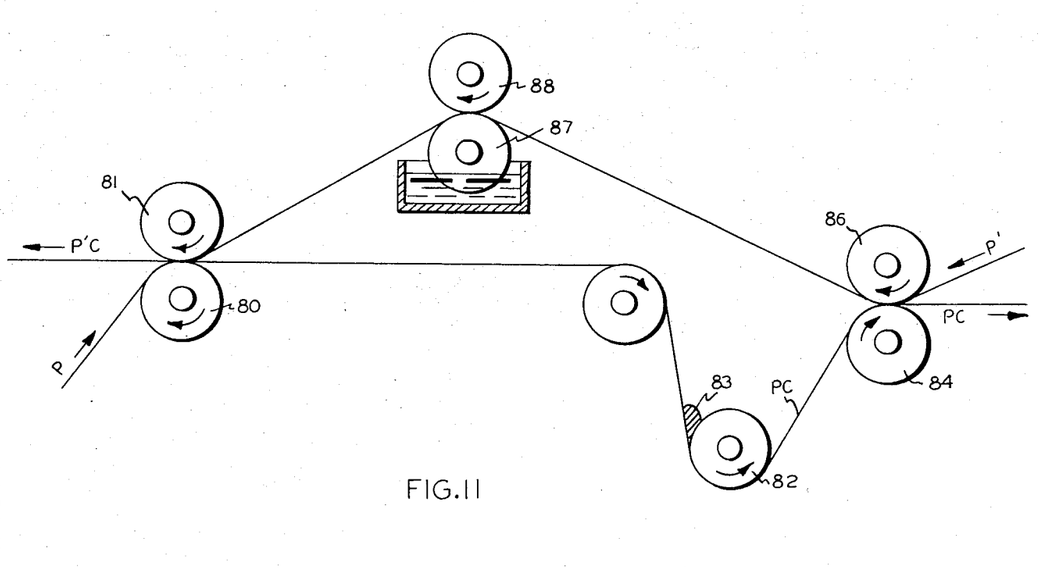
FIG. 11 is a diagrammatic view in cross section of a modification of this invention showing in the same operation the double coating and smoothing of two separate webs in a nip.

FIG. 11 shows a modification of this invention in which two separate webs P and P' are double coated and smoothed. Two pairs of adjustably spaced rolls 80, 81 and 84, 86 are employed. The two webs P and P' are fed in opposite directions through the nips formed by these pairs of rolls so that each web as it enters the process smoothes the coating on the other web as it leaves the process. The spacing between the pairs of rolls is adjusted as required for satisfactory smoothing.

The uncoated paper web P travels between the nip formed between rollers 80 and 81. The roll 80 travels with the web P at web speed, while the roll 81 has a direction at the nip reverse to the web P. The web P proceeds to a coating roll 82 where a coating composition 83 is applied. The coated paper web PC travels into the nip formed by rollers 84 and 86 which operate at the same speeds and directions respectively as rolls 80 and 81. As the web PC passes through this nip, it encounters entering uncoated paper web P' traveling in an opposite direction. Upon contact of their respective surfaces, the clean uncoated paper web P' meters and smoothes the wet coating on web PC and is partially coated itself. The double coated web PC then proceeds to a drier and is wound on a storage roll.

Web P' proceeds from the nip of rolls 84 and 86 to be coated in the nip of coating rolls 87 and 88. The web leaves this coating stage as coated web P'C and passes through the nip formed by rollers 80 and 81. As coated web P'C passes through this nip, its coating is metered and smoothed by the entering uncoated web P. Uncoated web P removes the excess coating from coated web P'C and is partially coated itself before it enters a coating stage. Thus the webs P and P' are both double coated and perform reciprocal functions of smoothing each other.

Figure 12:
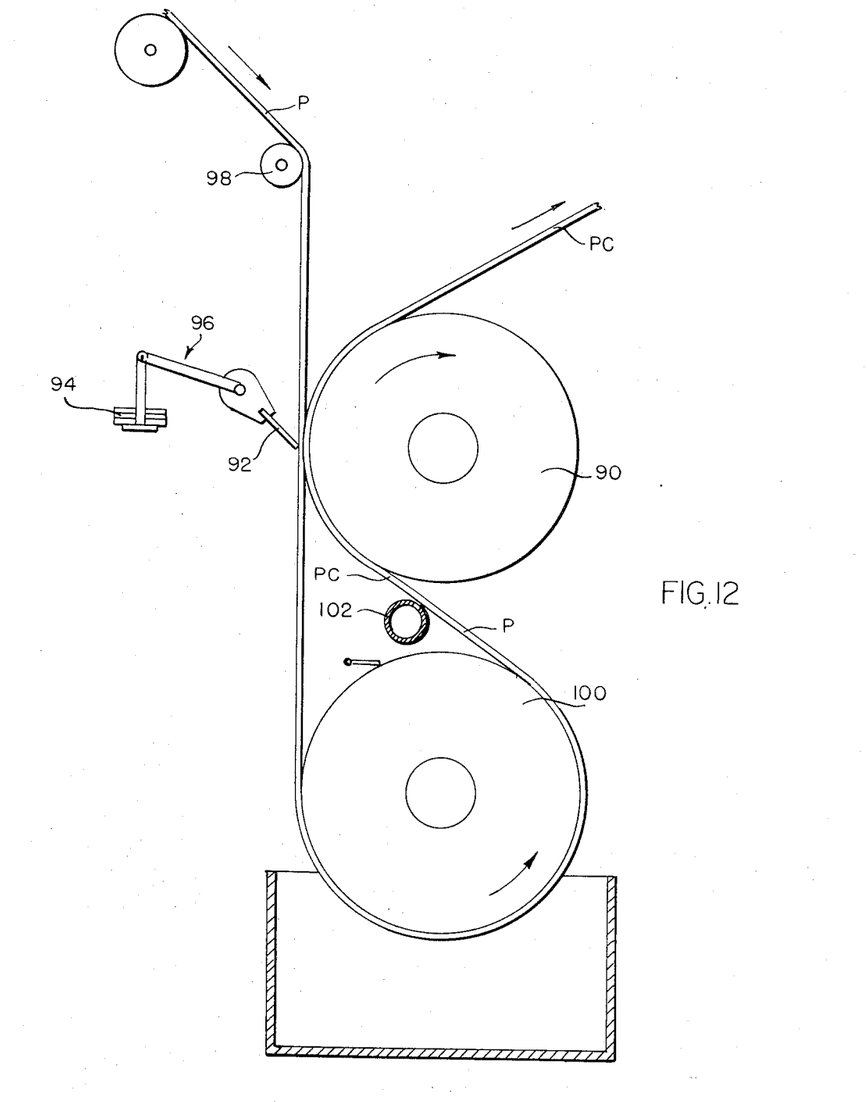
FIG. 12 is a diagrammatic view in cross section of another embodiment of the invention showing an alternative arrangement and method for supporting the paper web during the smoothing process in a nip; and, FIG. 13 is a diagrammatic view in cross section of still another embodiment of the invention showing an alternative arrangement and method for supporting the paper web during the smoothing process in a nip formed by the web itself.

Another embodiment of the invention showing an alternative arrangement and method for supporting the web during the smoothing process is depicted in FIG. 12. In this embodiment the coating composition on web PC is worked by the uncoated surface of web P in an adjustable nip formed by exit roll 90 and a torque bar actuated trailing blade 92. The pressure exerted by blade 92 against the outside surface of web P and, hence, the amount of surface "working" performed in the nip, can be varied by adding or subtracting weights 94 from the torque bar assembly which is indicated generally as 96.

The uncoated web P enters the nip in a straight, vertical run from entrance roll 98 to feed roll 100 without bending around the exit roll 90. It will be appreciated that in the present embodiment, the exit roll 90 provides the necessary support for the coated web PC in the nip as well as performing its normal function as an exit roll.

Any suitable arrangement for applying the coating composition to web P can be employed with the embodiment of the invention depicted in FIG. 12. As shown in FIG. 12, its coating material is applied to web P by means of an apertured feed pipe 102 positioned beneath and extending across the width of web P. By continuously supplying the liquid coating material to feed pipe 102 under pressure, a pool of coating material will be established and maintained between the feed pipe and the surface of web P. Alternatively feed roll 100 can be used as a coating roll by forming a pool of coating material between the roll and web P as shown, for example, in FIG. 3.

Figure 13:
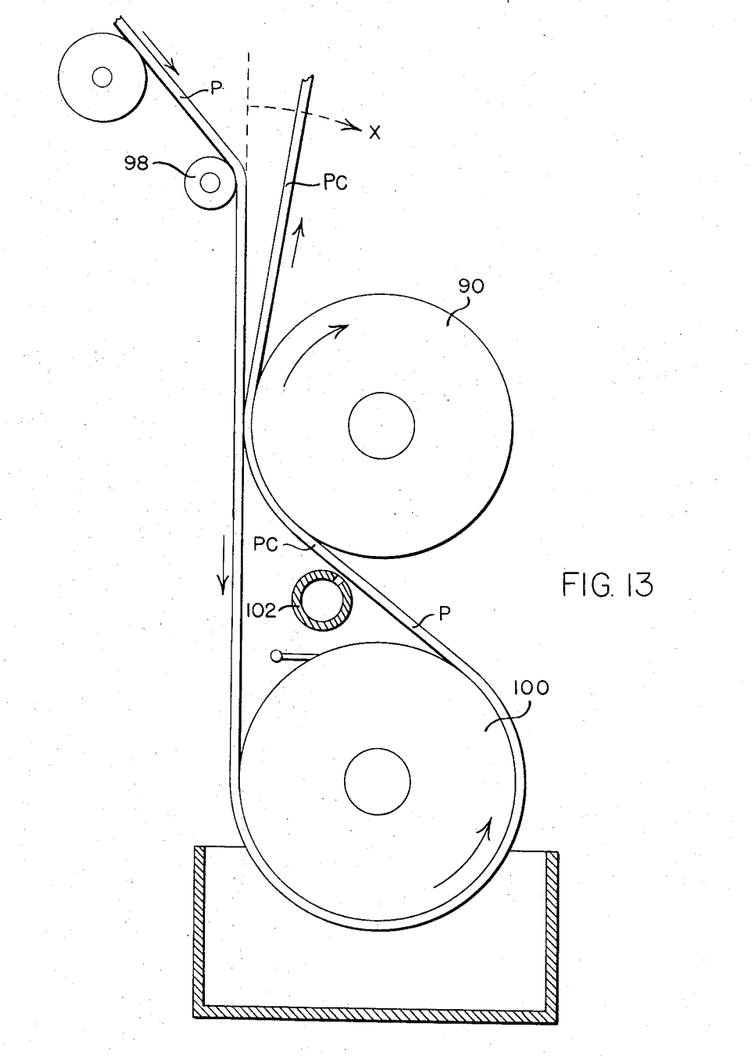

Turning now to FIG. 13, there is shown another embodiment of the invention in which the particular angular relationship between the uncoated web P and coated web PC at the point of contact establishes a web surface working area which performs the same functions i.e., smoothing and distributing the coating material, as the nip in each of the previously described embodiments.

The embodiment shown in FIG. 13 is similar in many respects to the embodiment shown in FIG. 12. In order to facilitate a comparison of the two embodiments, the same reference numerals have been used in FIG. 13 for the structural elements which are identical to those shown in FIG. 12.

In the embodiment depicted in FIG. 13, the uncoated web P performs the same straight, vertical run between entrance roll 98 and feed roll 100 without bending around the exit roll 90. Note, however, that the torque bar actuated trailing blade 92 (which together with exit roll 90 formed the nip in the embodiment shown in FIG. 12) has been omitted from the embodiment depicted in FIG. 13.

The second major difference between the two embodiments is the angle at which the coated web PC departs from the exit roll 90. It has been found that it is possible to run and to produce coated paper of satisfactory quality without using a blade or other means to force the two contacting portions of the web against the coated web supporting roll i.e., exit roll 90, if the coated web PC departs from the roll at a relatively shallow angle. The departure angle for the coated web PC is indicated in FIG. 13 by the capital letter X.

A departure angle or bend of approximately 10° from the tangent has been found to perform the same functions as a nip, albeit at a slight sacrifice in the percentage of solids in the coating composition. With a backing device, such as trailing blade 92, it is possible to run with 60–62% solids. However, without a backing device, i.e., the embodiment shown in FIG. 13, only 55% solids can be used for the same weight of coating applied.

The invention has been performed with various apparatus using the following compositions:

*Example 1*

In an embodiment of this invention, 14 point paperboard body stock was coated in an apparatus arrangement similar to that of FIG. 3. The board was coated on one side with a coating composition of the following formulation:

| | Parts by weight, dry |
|---|---|
| Clay | 80 |
| Calcium carbonate, finely divided | 20 |
| Casein | 15 |
| Dicyandiamide (to solubilize casein) | 3 |
| Ammonium nitrate (to solubilize casein) | 3 |
| Soap | 0.5 |
| Butadiene-styrene copolymer | 5 |
| Tributyl phopshate (anti-foaming agent) | 0.5 |

Water was added in sufficient quantity to render the composition approximately 42% solids.

In FIG. 3, the nip, where uncoated web P meets coated web PC, was adjusted to ⅛″ opening. Paper coated in this manner, after drying and calendering, was smooth and free from pattern development and in many respects superior to examples of similar paperboard coated by other methods.

*Example 2*

Paper having a basic weight of 60# (25″ x 38″ —500) was also coated by this process. 45# bodystock was coated with 15#'s coating/ream or 22 grams/sq. meter. A 42% solids coating composition as in Example 1 was used. Apparatus arrangement of FIG. 3 was used and the smoothing nip aperture was 1/16″. Paper was coated on one side, dried and calendered. Results obtained were also equally as good as those obtained with the board stock.

*Example 3*

In an embodiment of the invention, a conventional alkaline casein coating of the following composition was used to coat one side of a web having a finished weight of 60#'s/ream (25 x 38 —500): 45#'s/ream bodystock was coated with 15#'s/ream or 22 grams/sq. meter.

| | Parts by weight |
|---|---|
| Clay | 100 |
| Casein | 15 |
| Dicyandiamide | 2 |
| Ammonium hydroxide (used as a 28% aqueous solution of ammonia) | 2.25 |
| Soap | 0.5 |
| Tributyl phosphate | 0.5 |

Water was added in sufficient quantity to render the composition approximately 43% solids.

An apparatus arrangement similar to FIG. 1 was utilized and the smoothing nap was adjusted to an opening of 1/16″. Results obtained were equally as good as those obtained in the previous examples.

*Example 4*

In a further embodiment of the invention, a conventional starch coating of the following composition was used to coat one side of a web having a finished weight of 60#'s/ream (25 x 38 —500): 45#'s/ream bodystock was coated with 15#'s/ream or 22 grams/sq. meter.

| | Parts by weight, dry |
|---|---|
| Clay | 100 |
| Starch, oxidized | 30 |
| Soap | 0.5 |
| Tributyl phosphate | 0.5 |
| Melamine-formaldehyde resin | 3 |

Water was added in sufficient quantity to render the composition approximately 42% solids.

An apparatus arrangement similar to FIG. 2 was utilized and the smoothing nip was adjusted to an opening of 1/16″. Results obtained were equally as good as those obtained in the previous examples.

Obviously, many modifications and variations of the present invention are possible in the light of the above teaching. Therefore, the appended claims are intended to cover such modifications and variations as come within the true spirit and scope of this invention.

Having thoroughly described and disclosed the preferred embodiments of my invention, what I claim as new and desire to secure by Letters Patent of the United States is:

1. The method of distributing and smoothing a layer of viscous liquid coating material which has been deposited on a wide running paper web comprising the steps of: running an equal width uncoated fresh web surface in a direction opposite to that of said running web with said uncoated fresh web surface opposed to the coated surface of said running web; running the opposed coated and uncoated webs between spaced lateral supports extending across the width of the webs with the spacing between said supports controlling the transverse force which the opposed surfaces of said webs can apply to said viscous liquid coating material, and urging said opposed web surface into contact between said supports across the transverse dimension of said web with sufficient pressure to distribute and smooth said viscous liquid on said running web.

2. The method of uniformly coating one surface of a running paper web comprising the steps of: passing said web through a coating station to coat one surface of said web with a viscous liquid coating material; running an uncoated second paper web in a direction opposite to that of said coated web with said second web uncoated surface opposed to the coated surface of said running web; running the opposed coated and uncoated webs between spaced lateral supports extending across the width of the webs with the spacing between said supports controlling the transverse force which the opposed surfaces of said webs can apply to said viscous liquid coating material, and urging said opposed web surface into contact between said supports across the transverse dimension of said running web with sufficient pressure to distribute said viscous liquid material over said one surface.

3. The method of continuously coating one surface of a wide running paper web and smoothing the coating applied thereon comprising the steps of: passing the web through a coating station, applying a viscous liquid coating material to said web surface at said station; leading the uncoated portion of said web approaching said station and the coated portion of said web leaving said station to a common location at which the coated and uncoated portions of said web are moving in opposite directions with said coated surface therebetween; running the opposed coated and uncoated webs between spaced lateral supports extending across the width of the webs with the spacing between said supports controlling the transverse force which the opposed surfaces of said webs can apply to said viscous liquid coating material, and urging said opposed web surface into contact between said supports across the width of the web at said location for uniformly distributing and smoothing said viscous liquid coating material over said coated surface of said web.

4. The method of double coating and smoothing first and second running paper webs of equal width comprising the steps of: passing said webs through first and second coating stations, respectively, to coat one surface on each of said webs with a viscous liquid coating material; running each of said webs prior to being coated against the other web after coating; and, urging the coated surfaces of each web in contact with the uncoated surface of the other web across the entire width of said webs while said webs are traveling in opposite directions by running the opposed coated and uncoated webs between spaced lateral supports extending across the width of the webs with the spacing between said supports controlling the transverse force which the opposed surfaces of said webs can apply to said viscous liquid coating material to smooth the viscous liquid coating on the coated web with the smooth uncoated surface of the other web.

References Cited

UNITED STATES PATENTS

| | | |
|---|---|---|
| 1,673,958 | 6/1928 | Vannote. |
| 1,842,848 | 1/1932 | Steffen _______________ 117—64 |
| 2,114,618 | 4/1938 | Wallin _______________ 117—68 |
| 2,513,432 | 7/1950 | Sisson _______________ 117—102 |
| 2,688,567 | 9/1954 | Frank _______________ 117—64 |
| 2,712,508 | 7/1955 | Massey. |
| 3,235,400 | 2/1966 | Voelker ____________ 118—106 |

ALFRED L. LEAVITT, *Primary Examiner.*

A. H. ROSENSTEIN, *Assistant Examiner.*